United States Patent [19]

Lee

[11] Patent Number: 5,801,886
[45] Date of Patent: Sep. 1, 1998

[54] IMAGE MAGNIFICATION APPARATUS

[75] Inventor: Chun-Gon Lee, Kyeongsangnam-do, Rep. of Korea

[73] Assignee: Samsung Aerospace Industries, Ltd., Kyeongsangnam-do, Rep. of Korea

[21] Appl. No.: 802,995

[22] Filed: Feb. 21, 1997

[51] Int. Cl.$^6$ .............. G02B 3/00; G02B 15/02; G02B 9/12

[52] U.S. Cl. .............. 359/675; 359/649; 359/650; 359/651; 359/672; 359/673; 359/791

[58] Field of Search .............. 359/675, 649–651, 359/672, 673, 791

[56] References Cited

U.S. PATENT DOCUMENTS

| | | | |
|---|---|---|---|
| 4,154,508 | 5/1979 | Nakamura | 359/675 |
| 4,206,971 | 6/1980 | Hamanashi et al. | 359/675 |
| 4,239,340 | 12/1980 | Ogino | 359/675 |
| 4,253,736 | 3/1981 | Momiyama | 359/675 |
| 5,253,112 | 10/1993 | Suzuki et al. | 359/675 |

*Primary Examiner*—Georgia Y. Epps
*Assistant Examiner*—Evelyn A. Lester
*Attorney, Agent, or Firm*—Finnegan, Henderson, Farabow, Garrett & Dunner, L.L.P.

[57] ABSTRACT

An image magnification apparatus, for use in a video display system that displays an image of an object, comprising a connecting module for connecting the image magnifying apparatus to a lens module of the video display system, and an objective lens system for forming an optical image of the object. The apparatus also includes a conversion optical system for magnifying the optical image formed by the objective lens system. The conversion optical system further includes a first biconvex lens unit having a positive refractive power, a second biconvex lens unit having a positive refractive power, and a third biconcave lens unit having a negative refractive power.

3 Claims, 7 Drawing Sheets

SCAL .100
Distortion
Aberration

FIG. 3

SCAL .200
Longitudinal
Aberration

FIG. 9
*(PRIOR ART)*

IMAGE MAGNIFICATION APPARATUS

BACKGROUND OF THE INVENTION

1. Field of the Invention

The present invention relates to an image magnifying apparatus. More particularly, the present invention relates to an image magnifying apparatus to be used in a video display system.

2. Description of the Prior Art

Generally, a CCD (Charge Coupled Device) video display system receives an optical image of an object and converts it into an electrical signal. The video system transmits the electric signal to an image display device, such as a monitor or television, that produces a video image of the object.

The use of such video systems has been recently increasing. For instance, a video display system is often used for educational purposes by reproducing images of, for example, a three-dimensional object or a color picture album for use in seminars.

Figure 9:
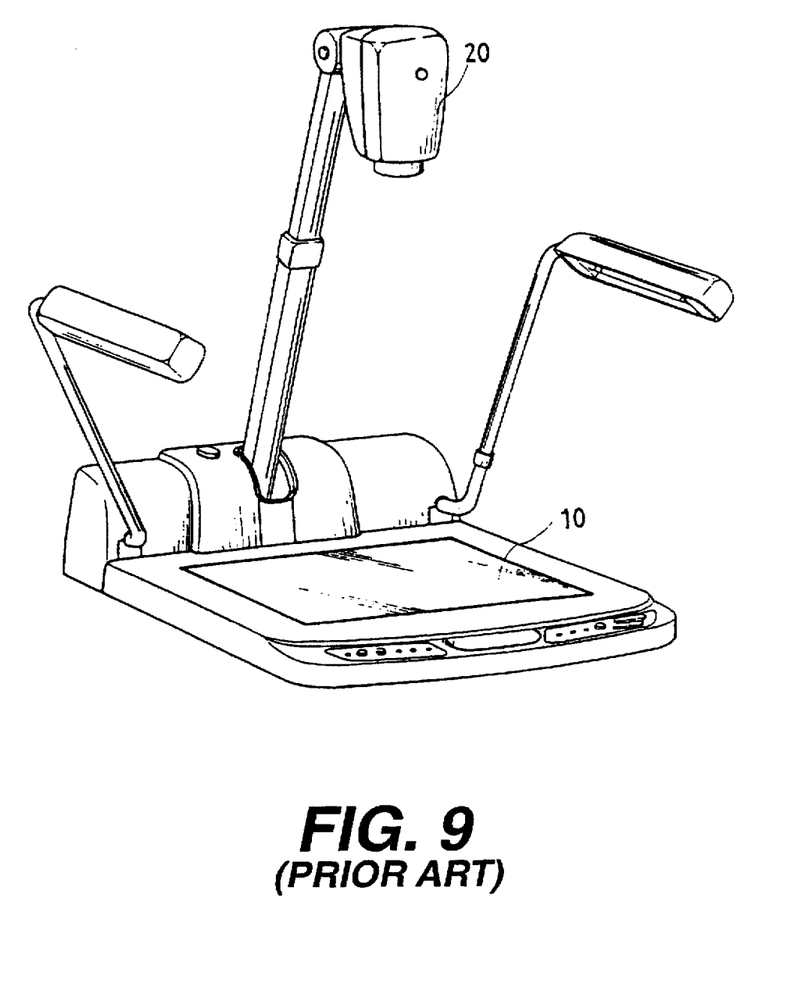
FIG. 9 is a perspective view of a prior art video display system.

FIG. 9 illustrates a prior art video system. Referring to FIG. 9, the prior art video system includes table 10 and video head 20. Video head 20 includes an image pick-up device (not shown) for picking up an image of an object placed on table 10. As known to those skilled in the art, the image pick-up device receives an optical image of an object formed by a lens module, and converts the optical image into an electrical signal. Video head 20 also includes an image processing device (not shown) for processing the electrical signal received from the image pick-up device. The processing device then transmits the processed electrical signal to a video display (not shown), which displays the image of the object.

However, the prior art video display system is not able to magnify the image of the object over the predetermined maximum magnification of the lens module. Thus, the prior art video system is unable to effectively display images of very small objects.

SUMMARY OF THE INVENTION

An important advantage of the present invention is the provision of an arrangement which substantially obviates one or more of the limitations and disadvantages of the described prior art methods. In particular, the present invention is directed to an image magnification apparatus and a conversion optical system that can magnify an object at high magnifications.

Additional features and advantages of the invention will be set forth in the description which follows, and in part will be obvious from the description, or may be learned by practice of the invention. The objectives and other advantages of the invention may be realized and attained by the apparatus particularly pointed out in the written description and claims hereof, as well as the appended drawings.

To achieve these and other advantages and in accordance with the purpose of the invention, as embodied and broadly described, the invention comprises an image magnifying apparatus for use in a video display system that displays an image of an object. The apparatus comprises a connecting means for connecting the image magnifying apparatus to a lens module of the video display system. An objective lens system forms an optical image of the object, and a conversion optical system magnifies the optical image formed by the objective lens system. The conversion optical system further includes a first biconvex lens unit having a positive refractive power, a second biconvex lens unit having a positive refractive power, and a third biconcave lens unit having a negative refractive power.

According to an additional aspect of the invention, a conversion optical system is disclosed comprising a first biconvex lens unit having a positive refractive power, a second biconvex lens unit having a positive refractive power, and a third biconcave lens unit having a negative refractive power. In addition, the conversion optical system satisfies the following conditions:

$$0.48 < D/f < 0.51,$$

$$0.37 < fb/f < 0.4,$$

where:

D represents the total length of the conversion optical system;

f represents the focal length of the conversion optical system; and fb represents the back focal length of the conversion optical system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings.

DETAILED DESCRIPTION

Embodiments of the present invention will now be described with reference to the accompanying drawings.

Figure 5:
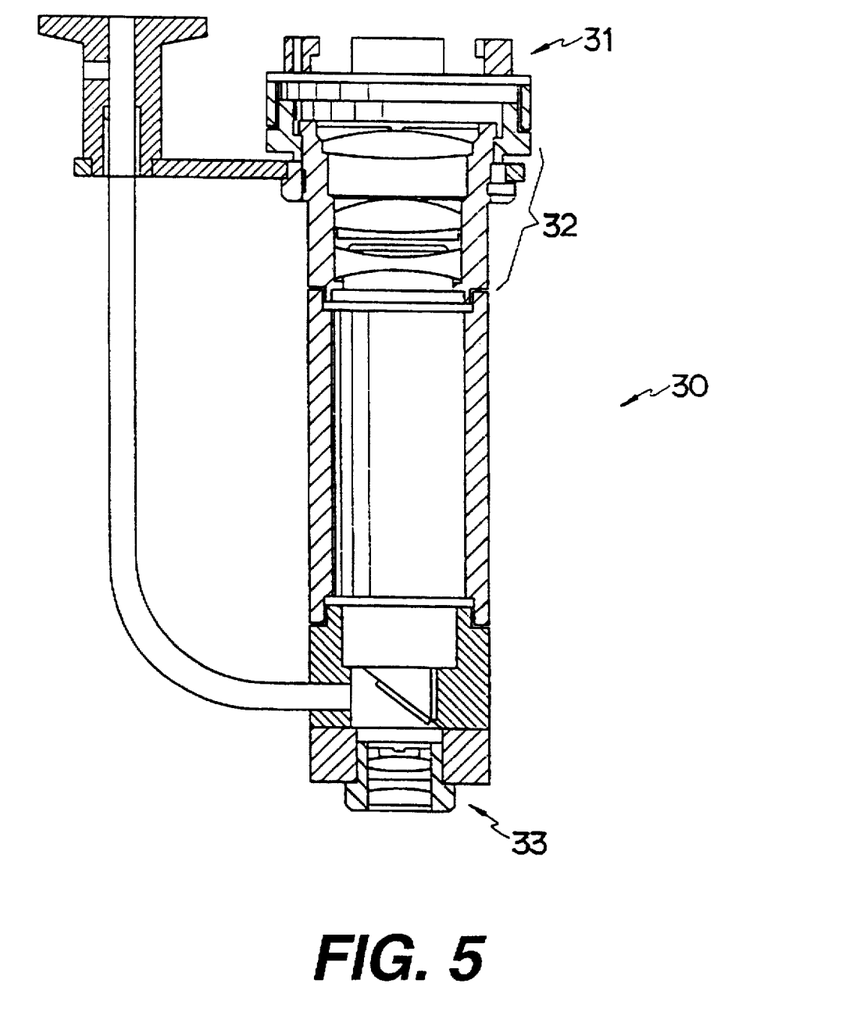
FIG. 5 is a cross-sectional view of an image magnifying apparatus according to an embodiment of the present invention.

FIG. 5 is a cross-sectional view of an image magnifying apparatus 30 according to an embodiment of the present invention. Referring to FIG. 5, image magnifying apparatus 30 comprises a connecting module 31, a conversion optical system 32, and an objective lens system 33. Objective lens system 33 forms an optical image of an object. Conversion optical system 32 receives the optical image from lens system 33 and magnifies the image. Objective lens system 33 is a commercially available lens system, and has at least one lens. Connecting module 31 is attached to a lens module installed in video head 20 (see FIG. 6) of the video display system.

Figure 1:
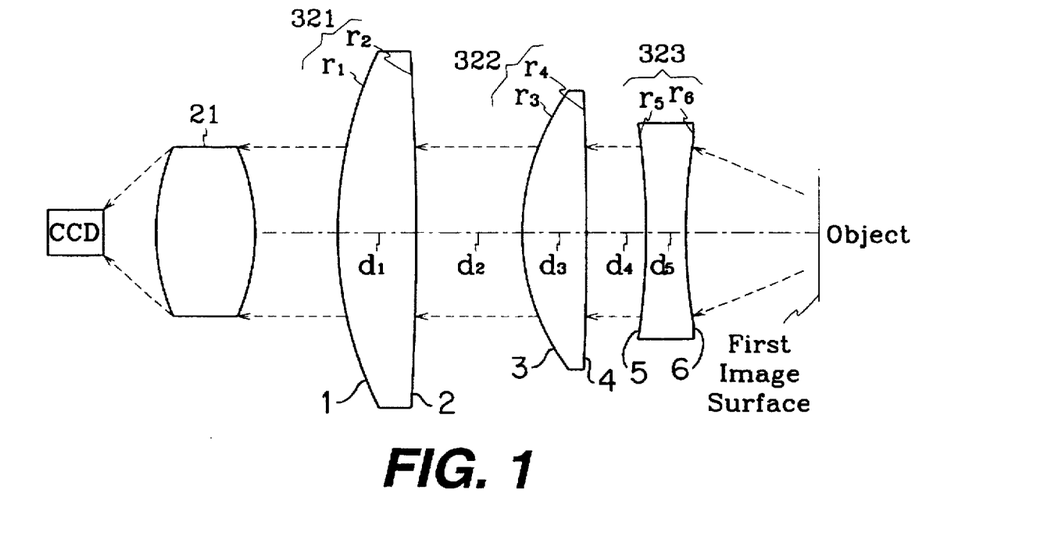
FIG. 1 is a cross-sectional view of a conversion optical system, according to an embodiment of the present invention.

FIG. 1 is a cross-sectional view of conversion optical system 32 shown in FIG. 5. Conversion optical system 32 includes a first biconvex lens unit 321, a second biconvex unit 322, and a third biconcave lens unit 323. First biconvex lens unit 321 has a positive refractive power, second biconvex lens unit 322 has a positive refractive power, and third biconcave lens unit 323 has a negative refractive power.

Figure 6:
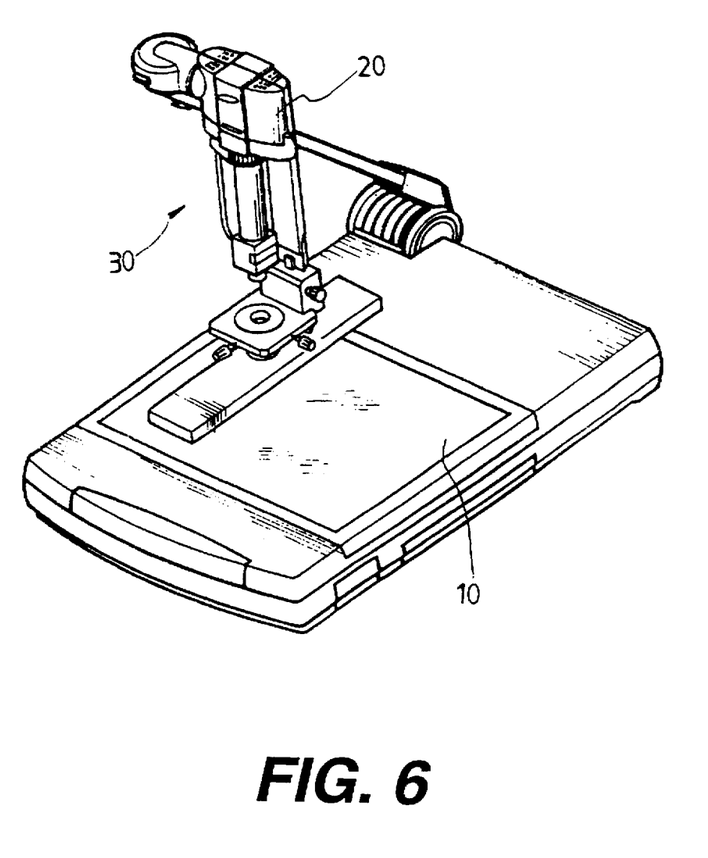
FIG. 6 is a perspective view of a video display system according to an embodiment of the present invention.

The operation of image magnifying apparatus 30, in accordance with an embodiment of the present invention, will now be described. As shown in FIG. 6, image magnifying apparatus 30 is attached to the lens module of the video display system when the system is to magnify the image of an object placed on table 10. Specifically, connecting module 31 (see FIG. 5) is attached to the lens module of the video display system.

According to the present invention, the magnification is easily changed by magnifying the object in two stages. First, objective lens system 33 forms and magnifies the image of the object. This image is then magnified again by conversion optical system 32. Conversion optical system 32 transmits the twice magnified optical image to a lens module 21 (see FIG. 1), which forms the image that is picked up by the image pick-up device (i.e., the CCD of FIG. 1). The image pick-up device is installed in video head 20 of the video display system.

Conversion optical system 32 and lens module 21 are separated by a predetermined image distance. Accordingly, if an image point of objective lens system 33 coincides with an object point of conversion optical system 32, it is possible to obtain an image of the object. Thus, any objective lens system which satisfies this condition can be used in the image magnifying apparatus 30, according to an embodiment of the present invention.

For systems, however, which first form the image of the object in the image pick-up device, it is difficult to achieve a desired magnification, while also maintaining a sufficient distance between the object and the image pick-up device. According to the present invention, on the other hand, the magnification is increased by using both objective lens system 33 and conversion optical system 32. By using systems 32 and 33, a sufficient distance is maintained between the object and the image magnification apparatus 30. Specifically, since the total magnification of the optical image is equal to the magnification of objective lens system 33 multiplied by that of conversion optical system 32, the amount of magnification required of objective lens system 33 is reduced. This, in turn, allows for a sufficient distance to be maintained between an object and objective lens system 33.

Figure 7:
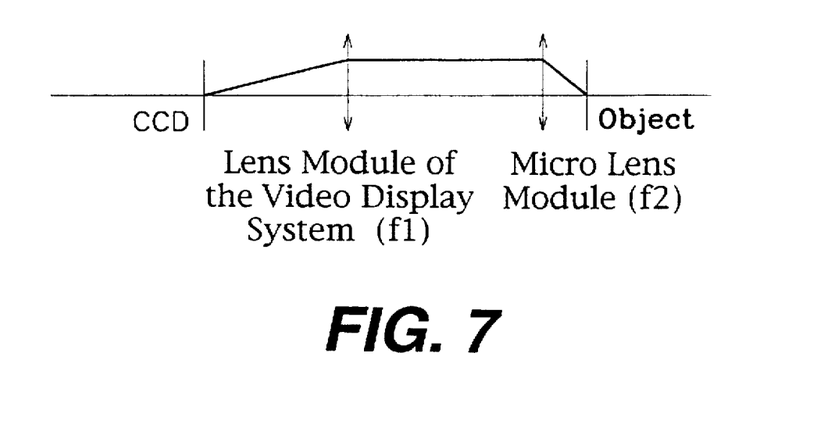
FIG. 7 diagrammatically illustrates the construction of an optical system that doesn't include a conversion optical system.

FIG. 7 diagrammatically illustrates an optical system for magnifying an object at high magnifications and which does not use conversion optical system 32. The total magnification of this optical system is f1/f2. The value f1 represents a focal length of the lens module of the video display system, and the value f2 represents a focal length of a micro lens module that is attached to the lens module when the image is to be magnified. To change the magnification, only f2 is changed since f1 is set in advance. For example, for a magnification of 6 times, f2 is equal to f1/6.

However, f2 is the distance between the object and the surface of micro lens module closest to the object. Thus as the magnification is increased, causing this distance to decrease, the object comes close to touching the surface of the lens. Therefore, the magnification of the system of FIG. 7 is limited by the amount of distance between the object and micro lens module.

Figure 8:
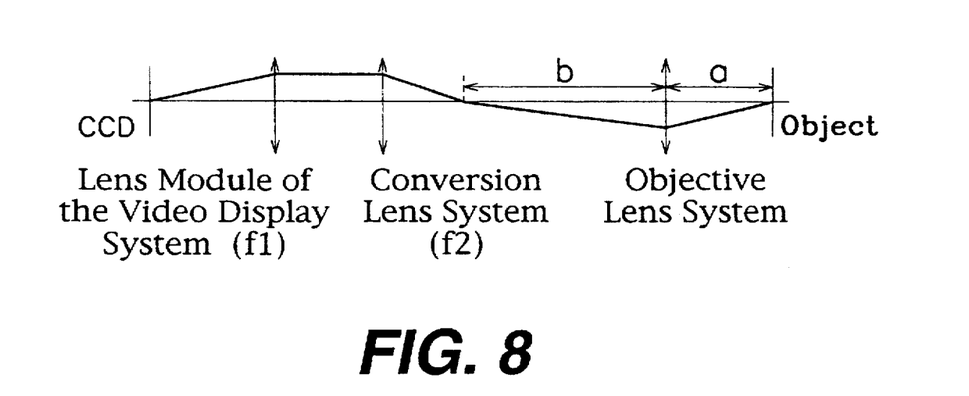
FIG. 8 diagrammatically illustrates the construction of an optical system of the video display system using a conversion optical system, according to an embodiment of the present invention.

To overcome this disadvantage, the magnification apparatus of the present invention preferably includes conversion optical system 32. FIG. 8 diagrammatically illustrates an optical system using conversion optical system 32. The total magnification m of the optical system shown in FIG. 8 is equal to m1×m2. The value m1 represents the combined magnification of conversion optical system 32 and the lens module of the video display system. The value m2 represents the magnification of objective lens system 33. Since m1 is equal to f1/f2 and m2 is equal to b/a, the total magnification m is equal to (f1/f2)×(b/a). The values "a" and "b" are defined in FIG. 8.

Referring to FIG. 8, the value "a" represents the distance between objective lens system 33 and the object. Further, to achieve a desired magnification, value "b" is increased. Thus, in order to increase the distance "a," the distance "b" should be increased. Therefore, the total magnification m is not changed and a sufficient distance can be maintained between objective lens system 33 and the object. The total magnification m is changed, however, by exchanging objective lens system 33 with another objective lens system, thereby easily providing for variable magnification.

Conversion lens system 32, according to an embodiment of the present invention, satisfies the following conditions:

(1) $0.48 < D/f < 0.51$, (2) $0.37 < fb/f < 0.4$, where:

D represents the total length of conversion optical system 32;

f represents the focal length of conversion optical system 32; and fb represents the back focal length of conversion optical system 32.

Condition 1 relates to an aberration, and condition 2 relates to the size of conversion optical system 32. If the upper limit of condition 2 is exceeded, the size of conversion optical system 32 becomes large. If the lower limit of condition 2 is violated, the aberration increases.

Values which satisfy the above-mentioned conditions, according to a preferred embodiment of the invention, are described in the Tables below, with all units of length denominated in millimeters. In each of these Tables, the following variables are used:

ri (i=1~6) represents a radius of curvature of a refractive surface shown in FIG. 1;

di (i=1~6) represents a lens thickness or a distance between lenses shown in FIG. 1;

ni represents a d-line refractive index of a lens;

v represents an Abbe number of a lens; and

H represents the height of light in a lens, the lens having a height equal to 1, when the light incident to the lens is parallel to the optical axis of conversion optical system 32.

Values for a first preferred embodiment of the present invention are shown in Table 1, in which focal length f is 48.39 mm, back focal length fb is 18.87 mm, and length D is 23.39 mm. The surface numbers in Table 1 are those of lenses 321 through 325 in FIG. 1, and are so designated.

TABLE 1

| Surface No. | ri | di | ni | v | effective aperture |
|---|---|---|---|---|---|
| 1 | 28.80 | 4.98 | 1.4875 | 70.15 | 18.0 |
| 2 | −126.00 | 7.91 | | | 17.8 |
| 3 | 15.40 | 5.00 | 1.4875 | 70.15 | 15.0 |
| 4 | −66.00 | 4.00 | | | 13.6 |
| 5 | −21.95 | 2.00 | 1.7847 | 25.71 | 9.9 |
| 6 | 21.95 | | | | 9.1 |

TABLE 2

| Lens | power | power/ni | power/v | H | power × H |
|---|---|---|---|---|---|
| 321 | 0.02058 | 0.01383 | 0.000293 | 0.971 | 0.0200 |
| 322 | 0.03831 | 0.02576 | 0.000546 | 0.704 | 0.0270 |
| 323 | −0.07299 | −0.04090 | −0.002839 | 0.179 | −0.0131 |
| total | | −0.00131 | −0.002000 | | 0.0339 |

Figure 2A:
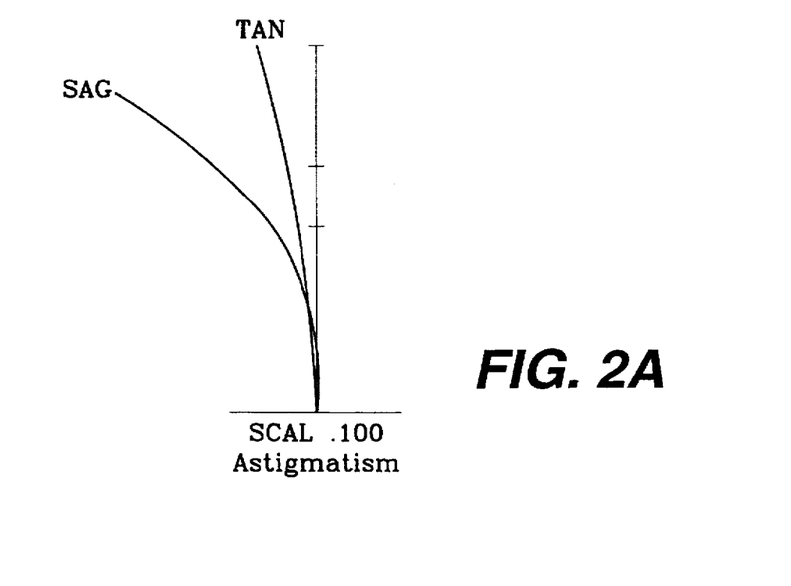
FIG. 2A shows astigmatism curves according to an embodiment of the present invention.
Figure 2B:
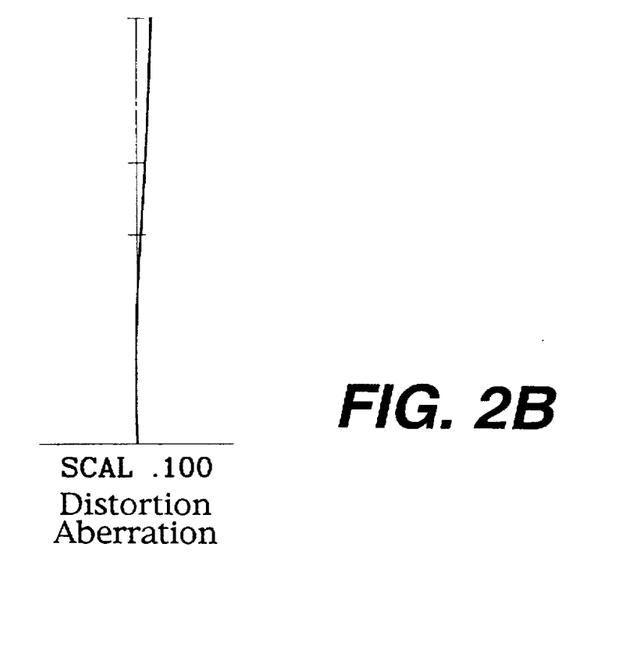
FIG. 2B shows distortion aberration curves according to an embodiment of the present invention.
Figure 3:
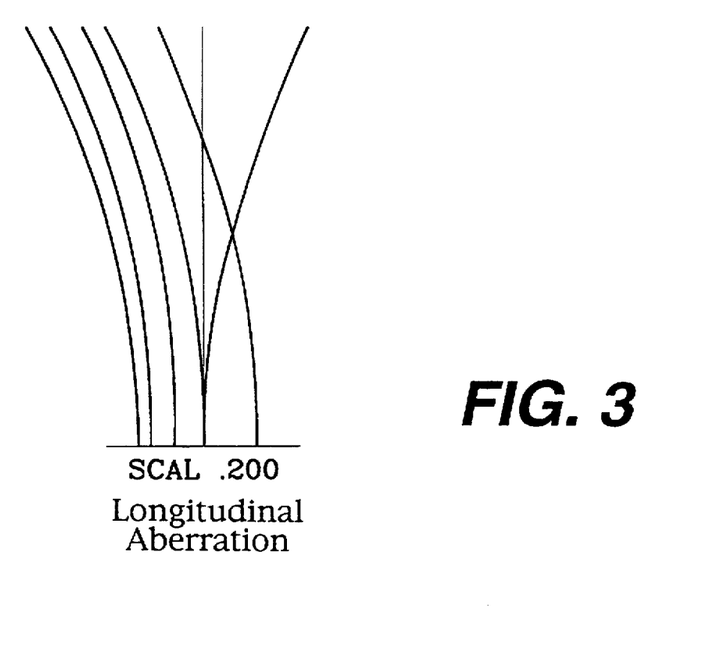
FIG. 3 shows longitudinal aberration curves according to an embodiment of the present invention.
Figure 4:
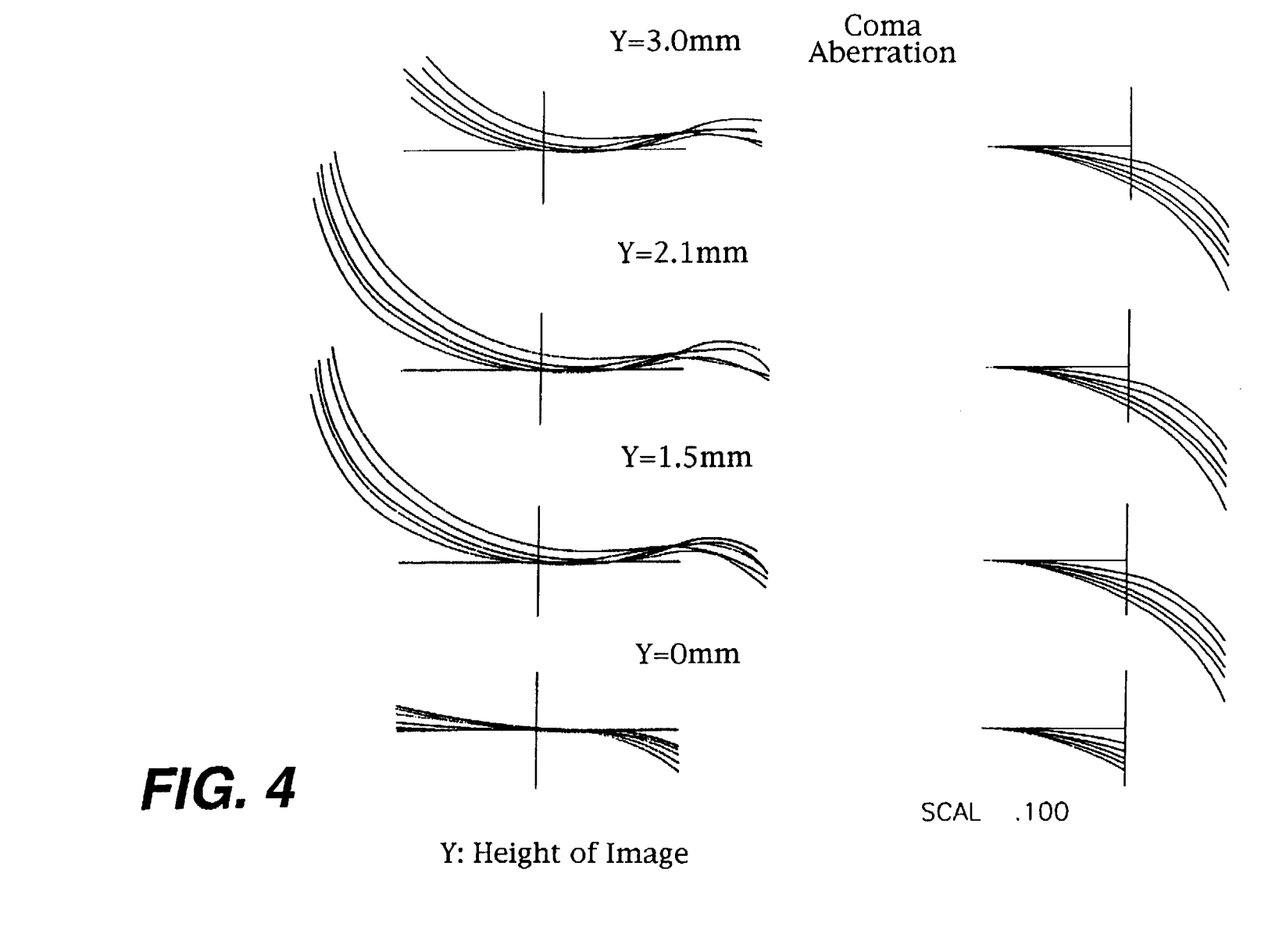
FIG. 4 shows coma aberration curves according to an embodiment of the present invention.

FIGS. 2 through 4 illustrate the superior astigmatism and aberration curves of the preferred embodiment of the present invention constructed in accordance with the data of Tables 1 and 2.

Objective lens system 33 forms the first image of the object placed on table 10 and magnifies the image by first magnification m1. Conversion optical system 32 magnifies this image again by second magnification m2, thus forming the second image. Conversion optical system 32 is formed according to the values described in Tables 1 and 2. The second image is then transmitted to the lens module installed in video head 20 of the video display system. Thus, the resulting image is magnified by a total magnification of m1×m2. The video display system then processes the magnified image and outputs a corresponding image signal to a display device, which transforms and displays the image.

In accordance with the preferred embodiments of the present invention, an image magnifying apparatus is provided which can magnify an object at high magnifications. Also provided is a conversion optical system, which is able to magnify an object using various microscopic objective lens. Further, using an embodiment of the invention, it is easy to compensate for an aberration and to thereby form an accurate image.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. An image magnifying apparatus, for use in a video display system that displays an image of an object, comprising:

a connecting means for connecting the image magnifying apparatus to a lens module of the video display system;

an objective lens system for forming an optical image of the object; and a conversion optical system for magnifying the optical image formed by the objective lens system, wherein the conversion optical system includes a first biconvex lens unit having a positive refractive power, a second biconvex lens unit having a positive refractive power, and a third biconcave lens unit having a negative refractive power, wherein the conversion optical system satisfies the following conditions:

$0.48 < D/f < 0.51$, and $0.37 < fb/f < 0.4$, where:

D represents a length of the conversion optical system;

f represents a focal length of the conversion optical system; and fb represents a back focal length of the conversion optical system.

2. The apparatus of claim 1, wherein the magnification of the apparatus is calculated by the following equation:

$m = m1 \times m2$ where:

m1 represents the combined magnification of the conversion optical system and the lens module of the video display system; and m2 represents the magnification of the objective lens system.

3. A conversion optical system, comprising:

a first biconvex lens unit having a positive refractive power;

a second biconvex lens unit having a positive refractive power;

a third biconcave lens unit having a negative refractive power; and wherein the following conditions are satisfied:

$0.48 < D/f < 0.51$, $0.37 < fb/f < 0.4$, where:

D represents the total length of the conversion optical system;

f represents the focal length of the conversion optical system; and fb represents the back focal length of the conversion optical system.

* * * * *